(12) United States Patent
Kitayama et al.

(10) Patent No.: US 10,479,886 B2
(45) Date of Patent: Nov. 19, 2019

(54) OPTICAL RESIN COMPOSITION AND FILM

(71) Applicant: Kaneka Corporation, Osaka (JP)

(72) Inventors: Fuminobu Kitayama, Hyogo (JP); Haruki Koyama, Osaka (JP); Tomoki Hiiro, Osaka (JP)

(73) Assignee: KANEKA CORPORATION, Osaka (JP)

( * ) Notice: Subject to any disclaimer, the term of this patent is extended or adjusted under 35 U.S.C. 154(b) by 204 days.

(21) Appl. No.: 15/393,842

(22) Filed: Dec. 29, 2016

(65) Prior Publication Data

US 2017/0107369 A1 Apr. 20, 2017

Related U.S. Application Data

(63) Continuation of application No. PCT/JP2015/003257, filed on Jun. 29, 2015.

(30) Foreign Application Priority Data

Jun. 30, 2014 (JP) ................................. 2014-135015

(51) Int. Cl.
| | | |
|---|---|---|
| *C08L 33/00* | (2006.01) | |
| *C08F 265/06* | (2006.01) | |
| *C08L 51/00* | (2006.01) | |
| *G02B 5/30* | (2006.01) | |
| *G02B 1/14* | (2015.01) | |
| *C08J 5/18* | (2006.01) | |
| *G02B 1/04* | (2006.01) | |

(52) U.S. Cl.
CPC ............ *C08L 33/00* (2013.01); *C08F 265/06* (2013.01); *C08J 5/18* (2013.01); *C08L 51/00* (2013.01); *G02B 1/04* (2013.01); *G02B 1/14* (2015.01); *G02B 5/30* (2013.01); *G02B 5/3033* (2013.01); *C08J 2333/00* (2013.01); *C08L 2203/16* (2013.01)

(58) Field of Classification Search
CPC ....... C08L 33/12; C08L 2207/53; C08J 3/126; C08J 2333/12; C08J 2433/12
See application file for complete search history.

(56) References Cited

U.S. PATENT DOCUMENTS

2013/0171438 A1* 7/2013 Hayashi ................... C08F 2/44
428/220

FOREIGN PATENT DOCUMENTS

| JP | H09-309938 A | 12/1997 |
|---|---|---|
| JP | 2001-181357 A | 7/2001 |
| JP | 2007-070624 A | 3/2007 |
| JP | 2009084574 A | 4/2009 |
| JP | 2010-024338 A | 2/2010 |
| JP | 2010-126550 A | 6/2010 |
| JP | 2010231016 A | 10/2010 |
| JP | 2011/006647 A | 1/2011 |

OTHER PUBLICATIONS

International Search Report and Written Opinion dated Sep. 29, 2015, issued by the Japan Patent Office in related International Application No. PCT/JP2015/003257, with English translations (15 pages).
PCT International Preliminary Report on Patentability (IPRP) dated Jan. 3, 2017, issued by the International Bureau of WIPO in related International Application No. PCT/JP2015/003257, with English translation (12 pages).

* cited by examiner

*Primary Examiner* — Mark S Kaucher
(74) *Attorney, Agent, or Firm* — Osha Liang LLP

(57) ABSTRACT

An optical resin composition from which a film with improved adhesion to a polyvinyl alcohol-based film and improved flex resistance can be obtained while keeping high film transparency. The optical resin composition includes: 99 to 50% by weight of an acrylic resin having a glass transition temperature of not lower than 110° C.; and 1 to 50% by weight of a particulate (meth)acrylic multilayer structure graft copolymer containing: an innermost layer made of a polymer containing a methacrylic acid ester as a first monomer; a middle layer made of a polymer containing, as a second monomer, an acrylic acid alkyl ester having an alkyl group with 4 to 12 carbon atoms; and an outermost layer made of a polymer containing a methacrylic acid ester as a third monomer. A graft ratio of the (meth)acrylic multilayer structure graft copolymer is not less than 110%.

8 Claims, No Drawings

OPTICAL RESIN COMPOSITION AND FILM

TECHNICAL FIELD

The present invention relates to an optical resin composition and a film.

BACKGROUND

Light-permeable resins are widely used as materials for forming optical members such as film-shaped, plate-shaped, and lens-shaped ones for use in various optical devices (e.g., films, substrates, and prism sheets for use in liquid crystal display devices; lenses in lens systems for signal reading of optical disc devices; and Fresnel lenses and lenticular lenses for projection screens). Such resins are called "optical resins" or "optical polymers" in general.

Among these optical members, for example, a thin-film polarizing plate for use in a liquid crystal display device is usually formed by laminating a polarizer-protective film on at least one surface of a polarizer for the purpose of protecting the polarizer.

For example, a cellulose triacetate resin, polyester resin, or (meth)acrylic resin is used for such a polarizer-protective film. As one example, in the case of a polarizer-protective film in which a (meth)acrylic resin is used, Patent Literature 1 discloses forming an adhesive layer between the polarizer-protective film and a polarizer in order to improve the adhesion of the polarizer-protective film to the polarizer (for example, a hydrophilic polymeric film such as a polyvinyl alcohol-based film is used as the polarizer).

Patent Literature 2 discloses laminating a polarizer and a polarizer-protective film together by using an adhesive, the polarizer-protective film containing a thermoplastic resin and elastic body particles.

CITATION LIST

Patent Literature

PTL 1: Japanese Laid-Open Patent Application Publication No. 2009-84574
PTL 2: Japanese Laid-Open Patent Application Publication No. 2010-231016

SUMMARY

There is a conventional polarizer-protective film in which a (meth)acrylic resin containing elastic body particles is used. When such a conventional polarizer-protective film and a polarizer are laminated together via an easily adhesive layer, the adhesion to the polarizer is insufficient. One or more embodiments of the present invention provide a film with improved adhesion to a polyvinyl alcohol-based film and improved flex resistance while keeping high film transparency.

One or more embodiments of the present invention relate to an optical resin composition including: 99 to 50% by weight of an acrylic resin having a glass transition temperature of not lower than 110° C.; and 1 to 50% by weight of a particulate (meth)acrylic multilayer structure graft copolymer. The (meth)acrylic multilayer structure graft copolymer contains: an innermost layer made of a polymer containing a methacrylic acid ester as its main monomer; a middle layer made of a polymer containing, as its main monomer, an acrylic acid alkyl ester having an alkyl group with 4 to 12 carbon atoms; and an outermost layer made of a polymer containing a methacrylic acid ester as its main monomer. A graft ratio of the (meth)acrylic multilayer structure graft copolymer is not less than 40%.

Among monomers constituting the outermost layer of the (meth)acrylic multilayer structure graft copolymer, the methacrylic acid ester may account for not less than 90% by weight.

A mean particle diameter in layers of the (meth)acrylic multilayer structure graft copolymer excluding the outermost layer is not more than 100 nm.

One or more embodiments of the present invention also relate to a film made of the above optical resin composition.

One or more embodiments of the present invention make it possible to obtain a film with improved adhesion to a polyvinyl alcohol-based film and improved flex resistance while keeping high film transparency.

DETAILED DESCRIPTION OF EMBODIMENTS

Each of an optical resin composition and a film made thereof contain an acrylic resin and a (meth)acrylic multilayer structure graft copolymer.

[Acrylic Resin]

The acrylic resin is not particularly limited, so long as it is a thermoplastic acrylic resin. Generally speaking, an acrylic resin is a resin containing a (meth)acrylic acid ester unit and/or a (meth)acrylic acid unit. The acrylic resin may contain a structural unit derived from a (meth)acrylic acid ester derivative or (meth)acrylic acid derivative. It should be noted that, in one or more embodiments of the present invention, the term "(meth)acryl" means "methacryl or acryl". The sum of the proportions of the (meth)acrylic acid ester unit, the (meth)acrylic acid unit, and the structural unit derived from the aforementioned derivative usually accounts for not less than 50% by weight, such as not less than 60% by weight, and such as not less than 70% by weight in all the structural units of the acrylic resin.

Examples of the (meth)acrylic acid ester unit include structural units derived from monomers, such as methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, benzyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, 2-(hydroxymethyl) methyl acrylate, 2-(hydroxyethyl) methyl acrylate, glycidyl (meth)acrylate, epoxycyclohexylmethyl (meth)acrylate, dicyclopentenyl (meth)acrylate, 2,2,2-trifluoroethyl (meth)acrylate, 2,2,2-trichloroethyl (meth)acrylate, and isobornyl (meth)acrylate. In particular, the acrylic resin may contain a methyl (meth)acrylate unit since it improves thermal stability. In a case where the acrylic resin is a resin obtained by polymerizing a vinyl-based monomer containing a (meth)acrylic acid alkyl ester, the acrylic resin is a resin obtained by polymerizing 30 to 100% by weight of methyl methacrylate with 70 to 0% by weight of a monomer copolymerizable with the methyl methacrylate.

Examples of the (meth)acrylic acid unit include methacrylic acid and acrylic acid. The amount of the (meth)acrylic acid unit to be used may be 0 to 20% by weight in all the structural units of the acrylic resin.

It should be noted that the acrylic resin may contain two or more kinds of structural units from among the above exemplified (meth)acrylic acid ester units and (meth)acrylic acid units. The acrylic resin may additionally contain a structural unit different from the (meth)acrylic acid ester units and (meth)acrylic acid units. Examples of the additional structural unit include: styrene; vinyltoluene; α-methylstyrene; acrylonitrile; methyl vinyl ketone; ethylene; propylene; vinyl acetate; methallyl alcohol; allyl alcohol; 2-hydroxymethyl-1-butene; α-hydroxymethyl styrene; α-hydroxyethyl styrene; 2-(hydroxyalkyl) acrylic acid esters, such as 2-(hydroxyethyl) methyl acrylate; 2-(hydroxyalkyl) acrylates, such as 2-(hydroxyethyl) acrylate; maleic acid, fumaric acid, and esters of these; vinyl halides, such as vinyl chloride, vinyl bromide, and chloroprene; vinyl acetate; alkenes, such as ethylene, propylene, butylene, butadiene, and isobutylene; halogenated alkenes; and polyfunctional monomers, such as allyl methacrylate, diallylphthalate, triallyl cyanurate, monoethylene glycol dimethacrylate, tetraethylene glycol dimethacrylate, tetraethylene glycol dimethacrylate, and divinylbenzene. Each of these vinyl-based monomers may be used alone, or two or more kinds of these vinyl-based monomers may be used in combination. It should be noted that by adjusting the ratio among the above structural units, intended intrinsic birefringence can be imparted.

The acrylic resin may be used since it has excellent optical properties, thermal resistance, mold processability, etc.

The glass transition temperature of the acrylic resin may be not lower than 110° C., such as not lower than 115° C., and such as not lower than 120° C. If the glass transition temperature is lower than 110° C., it may cause reduction in the thermal resistance of the film. As a result, the physical properties of the film vary greatly at high temperatures, and for this reason, the range of applications of the film is narrowed down. Particularly in a case where the film is used for optical application, since the film with such a low glass transition temperature is easily deformed in a high-temperature environment, there is a tendency that stable optical properties cannot be obtained, which is unfavorable. There is no particular upper limit value of the glass transition temperature. However, from the viewpoint of melt processability, the glass transition temperature may be not higher than 200° C., such as not higher than 180° C.

In order to set the glass transition temperature of the acrylic resin to 110° C. or higher, the kind and ratio of the aforementioned monomers to be polymerized or copolymerized may be adjusted. For example, in a case where the acrylic resin is composed of methyl methacrylate and methyl acrylate, the amount of the methyl acrylate used in the acrylic resin is not more than 5% by weight, such as not more than 3% by weight, and such as not more than 1% by weight. The acrylic resin may be composed solely of methyl methacrylate without using methyl acrylate.

The glass transition temperature can be measured by using a differential scanning calorimeter (DSC). A specific example of an acrylic resin having a glass transition temperature of not lower than 120° C. is an acrylic resin containing a glutarimide structure, a glutaric anhydride structure, a (meth)acrylic acid unit, a lactone ring, or a maleimide structure in its molecule. Examples of such an acrylic resin include polyglutarimide acrylic resins, glutaric anhydride acrylic resins, lactone-cyclized acrylic resins, acrylic resins containing a hydroxyl group and/or a carboxyl group, methacrylic resins, and maleimide acrylic resins. A glutarimide acrylic resin may be used because the resulting film is improved in terms of thermal resistance and also excellent in terms of optical properties when stretched.

The acrylic resin content in the optical resin composition may be 99 to 50% by weight, such as 99 to 75% by weight, and such as 99 to 85% by weight. If the acrylic resin content is less than 50% by weight, then thermal resistance and surface hardness may be reduced. If the acrylic resin content is more than 99% by weight, it may cause reduction in strength, which is unfavorable.

The optical resin composition may contain only one kind of acrylic resin, or may contain two or more kinds of acrylic resins in combination.

[(Meth)Acrylic Multilayer Structure Graft Copolymer]

The (meth)acrylic multilayer structure graft copolymer is a polymer obtained by causing a graft polymerization reaction of an acrylic resin with another acrylic resin, or by causing a graft polymerization reaction of an acrylic resin with a non-acrylic resin. In the case of causing the graft polymerization reaction twice or more, the polymerization reactions may be caused by multi-stage polymerization.

The (meth)acrylic multilayer structure graft copolymer may be a particulate copolymer.

The multilayer structure may include a soft polymer layer and a hard polymer layer. In this case, an innermost layer is "hard", a middle layer is "soft", and an outermost layer is "hard", because when the innermost layer is "hard", transparency, strength, and surface hardness are improved. The particulate (meth)acrylic multilayer structure graft copolymer may include three or more layers, so long as the multilayer structure includes an innermost layer, a middle layer, and an outermost layer. For example, in a case where the multilayer structure includes four layers, one or more soft layers may be further formed inside the innermost layer, and in a case where the multilayer structure includes five or more layers, one or more soft layers and one or more hard layers may be further formed inside the innermost layer.

The term "soft" herein means that the glass transition temperature of the polymer is lower than 20° C. The glass transition temperature of the soft polymer may be lower than 0° C., such as lower than −20° C., from the viewpoint of enhancing the impact absorption capacity of a molded article made of the optical resin composition and enhancing an effect of improving the impact resistance of the molded article, such as cracking resistance. The term "hard" herein means that the glass transition temperature of the polymer is not lower than 20° C. The glass transition temperature of the hard polymer may be not lower than 50° C., such as not lower than 70° C., from the viewpoints of thermal resistance of the molded article and handleability (e.g., likelihood of blocking) of the (meth)acrylic multilayer structure graft copolymer.

The glass transition temperatures of the "soft" and "hard" polymers herein are values calculated by the Fox equation using values written in Polymer Hand Book (J. Brandrup, Interscience 1989) (for example, the glass transition temperature of polymethyl methacrylate is 105° C., and the glass transition temperature of polybutyl acrylate is −54° C.).

The (meth)acrylic multilayer structure graft copolymer may have a crosslinked structure in part thereof from the viewpoint of improving mechanical strength, and may be, for example, a multilayer structure polymer having a crosslinked polymer layer. The (meth)acrylic multilayer structure graft copolymer may have a hard polymer portion from the viewpoint of thermal resistance, and may have a non-crosslinked structure from the viewpoint of reducing birefringence. The (meth)acrylic multilayer structure graft copolymer may have a hard polymer portion with a non-crosslinked structure. For example, the (meth)acrylic multilayer structure graft copolymer may be a multilayer structure polymer having a hard polymer layer. The (meth)acrylic multilayer structure graft copolymer may have a multilayer structure polymer containing a crosslinked polymer layer and a hard polymer layer. Owing to having such a structure, the film made of the resin composition according to one or more embodiments of the present invention prevents degradation of adhesion and has high flex resistance while keeping its excellent transparency.

The particulate (meth)acrylic multilayer structure graft copolymer may include: an innermost layer made of a polymer containing a methacrylic acid ester as its main monomer; a middle layer made of a polymer containing, as its main monomer, an acrylic acid alkyl ester having an alkyl group with 4 to 12 carbon atoms; and an outermost layer made of a polymer containing a methacrylic acid ester as its main monomer.

The graft ratio of the particulate (meth)acrylic multilayer structure graft copolymer may be not less than 40%, such as not less than 60%, such as not less than 80%, such as not less than 100%, such as not less than 110%, and such as not less than 120%. If the graft ratio is less than 40%, adhesion to an easily adhesive layer that is used for adhesion to a polarizer may become insufficient. Failure in adhesion to the easily adhesive layer is caused by, for example, the following factors: insufficient adhesion (affinity) between an acrylic polarizer-protective film and the easily adhesive layer; and material fracture of the acrylic polarizer-protective film. These two factors that may cause the adhesion failure can be eliminated by adopting an acrylic polarizer-protective film obtained by one or more embodiments of the present invention, and thereby the adhesion to the easily adhesive layer can be improved. This consequently makes it possible to improve adhesion to a polyvinyl alcohol-based film, and at the same time, improve the flex resistance of the film.

Moreover, the flex resistance can be improved with a small amount of the (meth)acrylic multilayer structure graft copolymer according to one or more embodiments of the present invention. This makes it possible to keep high surface hardness.

The graft ratio of the (meth)acrylic multilayer structure graft copolymer herein is an index indicating the weight ratio of the outermost layer grafted to the crosslinked polymer when the weight of the polymers constituting the layers from the innermost layer to the middle layer is assumed to be 100. An equation for calculating the graft ratio is described in Examples below.

It should be noted that there is a case where part of the hard polymer layer exists as a polymer that is not bound (not grafted) to the crosslinked polymer layer (such a polymer is called a free polymer). The free polymer is assumed to be contained in the (meth)acrylic multilayer structure graft copolymer.

Hereinafter each of the layers of the particulate (meth) acrylic multilayer structure graft copolymer is described in detail.

(Innermost Layer)

The innermost layer of the (meth)acrylic multilayer structure graft copolymer may be made of a polymer containing a methacrylic acid ester as its main monomer. The term "main monomer" herein refers to a monomer that accounts for not less than 50% by weight in all the structural units of the polymer.

Among the structural units of the polymer constituting the innermost layer, the methacrylic acid ester unit may be not less than 60% by weight, such as not less than 80% by weight, and such as not less than 90% by weight, in order to improve transparency, hardness, and strength.

Examples of the methacrylic acid ester used in the innermost layer of the (meth)acrylic multilayer structure graft copolymer include methyl methacrylate, ethyl methacrylate, n-propyl methacrylate, n-butyl methacrylate, t-butyl methacrylate, n-hexyl methacrylate, cyclohexyl methacrylate, benzyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, and 2,3,4,5-tetrahydroxypentyl methacrylate. It should be noted that the polymer constituting the innermost layer may contain two or more kinds of these structural units.

In particular, methyl methacrylate may be used as the methacrylic acid ester from the viewpoint of improving transparency, hardness, and strength.

An acrylic acid alkyl ester can be suitably used as a monofunctional monomer among the monomers different from the main monomer. In light of polymerization reactivity and costs, the acrylic acid alkyl ester may have an alkyl group with 1 to 12 carbon atoms. The alkyl group may be either a straight-chain alkyl group or a branched-chain alkyl group. Specific examples of the acrylic acid alkyl ester include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate.

Other examples of the monofunctional monomer include: unsubstituted and/or substituted maleic anhydrides, such as maleic anhydride, citraconic anhydride, dimethylmaleic anhydride, dichloromaleic anhydride, bromomaleic anhydride, dibromomaleic anhydride, phenylmaleic anhydride, and diphenylmaleic anhydride; vinyl halides, such as vinyl chloride and vinyl bromide; (meth)acrylamides, such as acrylamide, methacrylamide, and N-methylolacrylamide; vinyl cyanides, such as acrylonitrile and methacrylonitrile; vinyl esters, such as vinyl formate, vinyl acetate, and vinyl propionate; aromatic vinyl and its derivatives, such as styrene, vinyltoluene, and α-methylstyrene; halogenated vinylidenes, such as vinylidene chloride and vinylidene fluoride; acrylic acid and its salts, such as acrylic acid, sodium acrylate, and calcium acrylate; methacrylic acid and its salts, such as methacrylic acid, sodium methacrylate, and calcium methacrylate; and (hydroxyalkyl) acrylic acid esters, such as 2-(hydroxymethyl) methyl acrylate, 2-(hydroxymethyl) ethyl acrylate, 2-(hydroxymethyl) isopropyl acrylate, 2-(hydroxymethyl) n-butyl acrylate, and 2-(hydroxymethyl) t-butyl acrylate. Each of these monomers may be used alone, or two or more kinds of these monomers may be used in combination.

Among these monomers, in light of favorable polymerizability with the methacrylic acid ester, the use of an acrylic acid ester may be used, or an acrylic acid alkyl ester may be used. Further, in light of suppressing zipper depolymerization, the use of methyl acrylate, ethyl acrylate, or n-butyl acrylate may be used.

In addition, a polyfunctional monomer can also be used as a monomer different from the main monomer. Examples of the polyfunctional monomer include allyl methacrylate, allyl acrylate, triallyl cyanurate, triallyl isocyanurate, diallylphthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylolpropane trimethacrylate, trimethylolpropane triacrylate, tetramethyrolmethane tetramethacrylate, tetramethyrolmethane tetraacrylate, dipropylene glycol dimethacrylate, and dipropylene glycol diacrylate. Two or more kinds of these polyfunctional monomers may be used in combination.

In a case where the aforementioned monofunctional monomer is copolymerized with a polyfunctional monomer having two or more non-conjugated reactive double bonds per molecule, the obtained polymer is a crosslinked polymer (rubber). The innermost layer may be a crosslinked polymer since it is favorable in terms of transparency, hardness, and strength.

A small amount of chain transfer agent may be additionally used as a monomer in the innermost layer of the (meth)acrylic multilayer structure graft copolymer. Here, a well-known chain transfer agent is usable. Examples of such a usable chain transfer agent include: alkyl mercaptans, such as octyl mercaptan, dodecyl mercaptan, and t-dodecyl mercaptan; and thioglycolic acid derivatives. By suitably using such a chain transfer agent, it is expected that internal stress of the hard polymer with a crosslinked structure due to excessive crosslinking is suitably reduced, and thereby strength is improved.

In the innermost layer, which may be a hard polymer layer, a suitable composition ratio of the monomer different from the main monomer is as follows from the viewpoint of the balance of hardness and cracking resistance. For example, if the monomer is an acrylic acid ester, the composition ratio thereof is 1 to 40% by weight; if the monomer is an aromatic vinyl-based monomer, the composition ratio thereof is 0 to 40% by weight; if the monomer is a polyfunctional monomer, the composition ratio thereof is 0.05 to 10% by weight; and if the monomer is a vinyl-based monomer copolymerizable with a methacrylic acid ester, an acrylic acid ester, and an aromatic vinyl-based monomer, the composition ratio thereof is 0 to 20% by weight.

(Middle Layer)

The middle layer of the (meth)acrylic multilayer structure graft copolymer may be made of a polymer containing an acrylic acid alkyl ester as its main monomer, the acrylic acid alkyl ester having an alkyl group with 4 to 12 carbon atoms.

Among the structural units of the polymer constituting the middle layer, the acrylic acid alkyl ester unit having an alkyl group with 4 to 12 carbon atoms may be not less than 60% by weight, such as not less than 70% by weight, and such as not less than 80% by weight, in order to improve strength.

The acrylic acid alkyl ester having an alkyl group with 4 to 12 carbon atoms, which is used in the middle layer of the (meth)acrylic multilayer structure graft copolymer, may have either a straight-chain alkyl group or a branched-chain alkyl group. Examples of the acrylic acid alkyl ester include n-butyl acrylate, isobutyl acrylate, t-butyl acrylate, 2-ethylhexyl acrylate, benzyl acrylate, n-octyl acrylate, β-hydroxyethyl acrylate, and dimethylaminoethyl acrylate. It should be noted that the polymer constituting the middle layer may contain two or more kinds of these structural units.

N-butyl acrylate or 2-ethylhexyl acrylate, and in particular, n-butyl acrylate may be used as the acrylic acid alkyl ester having an alkyl group with 4 to 12 carbon atoms in light of transparency, strength, and hardness.

As one example, a methacrylic acid ester is used as a monofunctional monomer among the monomers different from the main monomer. In light of polymerizability and costs, a methacrylic acid alkyl ester, such as a methacrylic acid alkyl ester having an alkyl group with 1 to 12 carbon atoms may be used. The alkyl group may be either a straight-chain alkyl group or a branched-chain alkyl group. Specific examples of the methacrylic acid alkyl ester include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate.

Other examples of the monofunctional monomer include: vinyl halides, such as vinyl chloride and vinyl bromide; (meth)acrylamides, such as acrylamide, methacrylamide, and N-methylolacrylamide; vinyl cyanides, such as acrylonitrile and methacrylonitrile; vinyl esters, such as vinyl formate, vinyl acetate, and vinyl propionate; aromatic vinyl and its derivatives, such as styrene, vinyltoluene, and α-methylstyrene; halogenated vinylidenes, such as vinylidene chloride and vinylidene fluoride; acrylic acid and its salts, such as acrylic acid, sodium acrylate, and calcium acrylate; and methacrylic acid and its salts, such as methacrylic acid, sodium methacrylate, and calcium methacrylate. Two or more kinds of these monomers may be used in combination.

Among these monomers, aromatic vinyl and its derivatives may be from the viewpoint of transparency, and styrene may be used from the viewpoint of polymerizability with an acrylic acid ester.

Further, examples of a polyfunctional monomer having two or more non-conjugated reactive double bonds per molecule include allyl methacrylate, allyl acrylate, triallyl cyanurate, triallyl isocyanurate, diallylphthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylolpropane trimethacrylate, trimethylolpropane triacrylate, tetramethyrolmethane tetramethacrylate, tetramethyrolmethane tetraacrylate, dipropylene glycol dimethacrylate, and dipropylene glycol diacrylate. Two or more kinds of these polyfunctional monomers may be used in combination. In a case where a polyfunctional monomer is used as a monomer different from the main monomer, the obtained polymer is a crosslinked polymer (rubber), and the structure of an unreacted non-conjugated double bond remaining in the obtained polymer and derived from the polyfunctional monomer acts as a grafting point where the polymer of the outermost layer is graft polymerized.

A small amount of chain transfer agent may be additionally used as a monomer in the middle layer of the (meth)acrylic multilayer structure graft copolymer. The aforementioned chain transfer agents usable in the innermost layer can be exemplified as chain transfer agents usable in the middle layer. By suitably using such a chain transfer agent, it is expected that the degree of crosslinking of the middle layer is suitably reduced while keeping high the rate of the graft coating of the outermost layer over the middle layer. This makes it possible to obtain favorable transparency and strength.

The middle layer may be a crosslinked polymer in light of transparency, strength, and hardness.

In the middle layer, which may be a soft polymer layer, a suitable composition ratio of the monomer different from the main monomer is as follows from the viewpoints of transparency, strength, and hardness. For example, if the monomer is a methacrylic acid alkyl ester, the composition ratio thereof is 0 to 40% by weight; if the monomer is an aromatic vinyl-based monomer, the composition ratio thereof is 0 to 40% by weight; if the monomer is a polyfunctional monomer, the composition ratio thereof is 0.05 to 10% by weight; and if the monomer is a vinyl-based monomer copolymerizable with a methacrylic acid ester, an acrylic acid alkyl ester, and an aromatic vinyl-based monomer, the composition ratio thereof is 0 to 20% by weight.

(Outermost Layer)

The outermost layer of the (meth)acrylic multilayer structure graft copolymer may be made of a polymer containing a methacrylic acid ester as its main monomer.

Among the structural units of the polymer constituting the outermost layer, the methacrylic acid ester unit may be not less than 60% by weight, such as not less than 70% by weight, such as not less than 80% by weight, such as not less than 90% by weight, such as not less than 95% by weight, and such as not less than 96% by weight, in light of transparency, strength, and hardness. Adopting these ranges may cause the affinity of the acrylic film to the easily adhesive layer to be improved, and also, the adhesion of the acrylic film to the easily adhesive layer may be improved owing to the suppression of material failure of the acrylic film.

Examples of the methacrylic acid ester used in the outermost layer of the (meth)acrylic multilayer structure graft copolymer include methyl methacrylate, ethyl methacrylate, n-propyl methacrylate, n-butyl methacrylate, t-butyl methacrylate, n-hexyl methacrylate, cyclohexyl methacrylate, benzyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, and 2,3,4,5-tetrahydroxypentyl methacrylate. It should be noted that the polymer constituting the outermost layer may contain two or more kinds of these structural units.

In particular, methyl methacrylate may be used as the methacrylic acid ester from the viewpoints of transparency, strength, and hardness.

An acrylic acid ester can be suitably used as a monomer different from the main monomer. In light of polymerization reactivity and costs, an acrylic acid alkyl ester such as an acrylic acid alkyl ester having an alkyl group with 1 to 12 carbon atoms may be used. The alkyl group may be either a straight-chain alkyl group or a branched-chain alkyl group. Specific examples of the acrylic acid alkyl ester include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate.

Other examples of the monomer include: unsubstituted and/or substituted maleic anhydrides, such as maleic anhydride, citraconic anhydride, dimethylmaleic anhydride, dichloromaleic anhydride, bromomaleic anhydride, dibromomaleic anhydride, phenylmaleic anhydride, and diphenylmaleic anhydride; vinyl halides, such as vinyl chloride and vinyl bromide; (meth)acrylamides, such as acrylamide, methacrylamide, and N-methylolacrylamide; vinyl cyanides, such as acrylonitrile and methacrylonitrile; vinyl esters, such as vinyl formate, vinyl acetate, and vinyl propionate; aromatic vinyl and its derivatives, such as styrene, vinyltoluene, and α-methylstyrene; halogenated vinylidenes, such as vinylidene chloride and vinylidene fluoride; acrylic acid and its salts, such as acrylic acid, sodium acrylate, and calcium acrylate; methacrylic acid and its salts, such as methacrylic acid, sodium methacrylate, and calcium methacrylate; and (hydroxyalkyl) acrylic acid esters, such as 2-(hydroxymethyl) methyl acrylate, 2-(hydroxymethyl) ethyl acrylate, 2-(hydroxymethyl) isopropyl acrylate, 2-(hydroxymethyl) n-butyl acrylate, and 2-(hydroxymethyl) t-butyl acrylate. Each of these monomers may be used alone, or two or more kinds of these monomers may be used in combination.

Among these monomers, from the viewpoint of polymerizability with the methacrylic acid ester, an acrylic acid ester such as an acrylic acid alkyl ester may be used. Further, in light of suppressing zipper depolymerization, the use of methyl acrylate, ethyl acrylate, or n-butyl acrylate may be used.

In addition, a polyfunctional monomer may be used as another copolymerizable monomer within such a range that advantageous effects will not be lost. Examples of the polyfunctional monomer include allyl methacrylate, allyl acrylate, triallyl cyanurate, triallyl isocyanurate, diallylphthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylolpropane trimethacrylate, trimethylolpropane triacrylate, tetramethyrolmethane tetramethacrylate, tetramethyrolmethane tetraacrylate, dipropylene glycol dimethacrylate, and dipropylene glycol diacrylate. Two or more kinds of these polyfunctional monomers may be used in combination.

The use of a polyfunctional monomer may be avoided from the viewpoints of: improving the dispersibility of the (meth)acrylic multilayer structure graft copolymer in the acrylic resin; improving the transparency and strength of the acrylic polarizer-protective film; improving the adhesion (affinity) of the acrylic polarizer-protective film to the easily adhesive layer; and suppressing material failure of the acrylic polarizer-protective film.

A small amount of chain transfer agent may be additionally used as a monomer in the outermost layer of the (meth)acrylic multilayer structure graft copolymer. The aforementioned chain transfer agents usable in the innermost layer or those usable in the middle layer can be exemplified as chain transfer agents usable in the outermost layer. By suitably using such a chain transfer agent, the graft ratio of the outermost layer to the middle layer is suitably adjusted, and the viscosity of the optical resin composition during melt processing is reduced. This makes it possible to improve workability while keeping transparency, strength, and flex resistance.

The outermost layer of the (meth)acrylic multilayer structure graft copolymer is constituted by a polymer whose weight average molecular weight may be more than 5,000, such as not less than 10,000, and such as not less than 20,000 in order to improve the dispersibility when blended with the acrylic resin by melt-kneading and increase the interfacial surface tension between the acrylic resin and the primary particles of the (meth)acrylic multilayer structure graft copolymer. If the weight average molecular weight is not more than 5,000, there is a possibility that the quality of the acrylic polarizer-protective film, according to one or more embodiments of the present invention, is spoiled due to, for example, the following factors: degradation in physical properties, such as transparency, strength, hardness, and flex resistance; and formation of faulty spots on the film due to aggregation of the (meth)acrylic multilayer structure graft copolymer.

The outermost layer of the (meth)acrylic multilayer structure graft copolymer may be a composite of the outermost layer having the above-described structure and an additional polymer layer having a function of improving the dispersibility when blended with the acrylic resin by melt-kneading. The layer having such a function may be, for example, a layer containing the same methacrylic acid ester and acrylic acid ester as those used in the outermost layer with the above-described structure, but containing the acrylic acid ester such that the content ratio of the acrylic acid ester in the layer is higher by 10% by weight or more, such as 20% by weight or more, than in the outermost layer with the above-described structure, and having a lower Tg than the outermost layer with the above-described structure. In the case of forming the layer having the aforementioned function, the layer may be formed at the outermost side on the outermost layer with the above-described structure, or formed immediately inside the outermost layer with the above-described structure.

In the outermost layer, which may be a hard polymer layer, a suitable composition of the monomer different from the main monomer is as follows from the viewpoint of the balance of hardness and cracking resistance. For example, if the monomer is an acrylic acid ester, the composition ratio thereof is 0 to 60% by weight; if the monomer is an aromatic vinyl-based monomer, the composition ratio thereof is 0 to 60% by weight; if the monomer is a polyfunctional monomer, the composition ratio thereof is 0 to 10% by weight; and if the monomer is a vinyl-based monomer copolymerizable with a methacrylic acid ester, an acrylic acid ester, and an aromatic vinyl-based monomer, the composition ratio thereof is 0 to 20% by weight.

((Meth)Acrylic Multilayer Structure Graft Copolymer)

A known polymerization initiator can be used in the production of the (meth)acrylic multilayer structure graft copolymer according to one or more embodiments of the present invention. Examples of the polymerization initiator include: persulfates, such as potassium persulfate, ammonium persulfate, and ammonium persulfate; perphosphates, such as sodium perphosphate; organic azo compounds, such as azobisisobutyronitrile; hydroperoxide compounds, such as cumene hydroperoxide, t-butyl hydroperoxide, 1,1-dimethyl-2-hydroxyethyl hydroperoxide, and p-menthane hydroperoxide; peroxy esters and peroxy carbonates, such as t-butyl isopropyloxycarbonate and t-butyl peroxybutyrate; and organic peroxy acylate compounds, such as benzoyl peroxide, dibutyl peroxide, and lauryl peroxide. Usable polymerization initiators are not limited to these initiators. Each of these initiators may be used as a thermally decomposable polymerization initiator, or may be used as a redox type polymerization initiator in the presence of a catalyst such as a ferrous sulfate and a water-soluble reductant such as ascorbic acid or sodium formaldehyde sulfoxylate. The polymerization initiator to be used may be suitably chosen in accordance with the composition of a monomer to be polymerized, a layered structure, a polymerization temperature condition, etc.

The polymerization initiator to be used is, for example, potassium persulfate, ammonium persulfate, or 1,1-dimethyl-2-hydroxyethyl hydroperoxide, each of which generates a highly water-soluble radical group when used as a thermally decomposable polymerization initiator or when used as a redox type radical polymerization initiator in the presence of a catalyst such as a ferrous sulfate and a water-soluble reductant such as ascorbic acid or sodium formaldehyde sulfoxylate.

Examples of a combination of polymerization initiators are as follows. If the monomer mixture forming the innermost layer is a monomer mixture having relatively high hydrophilicity and containing methyl (meth)acrylate as its main component, and the monomer mixture forming the middle layer is a monomer mixture having relatively high lipophilicity and containing such a component as butyl (meth)acrylate, 2-ethylhexyl acrylate, benzyl (meth)acrylate, phenoxyethyl (meth)acrylate, cyclohexyl (meth)acrylate, or styrene as its main component, then a polymerization initiator generating a radical group with relatively high lipophilicity and being selected from among, for example, organic azo compounds such as azobisisobutyronitrile, hydroperoxide compounds such as cumene hydroperoxide, t-butyl hydroperoxide, and p-menthane hydroperoxide, peroxy esters and peroxy carbonates such as t-butyl isopropyloxycarbonate and t-butyl peroxybutyrate, and organic peroxy acylate compounds such as benzoyl peroxide, dibutyl peroxide, and lauryl peroxide, may be used as a polymerization initiator for the innermost layer, and also, any of the aforementioned polymerization initiators generating a highly water-soluble radical group may be used as a polymerization initiator for the middle layer.

By using one or a combination of the above polymerization initiators in the production of the (meth)acrylic multilayer structure graft copolymer by emulsion polymerization, the interfaces among the innermost layer (including the internal layered structure of the innermost layer), the middle layer, and the outermost layer are formed clearly. This facilitates each layer to exert its function as intended. As a result, transparency, strength, hardness, and cracking resistance are obtained favorably.

The mean particle diameter in the layers of the particulate (meth)acrylic multilayer structure graft copolymer excluding the outermost layer may be not more than 450 nm, such as not more than 300 nm, such as not more than 150 nm, such as not more than 100 nm, and such as not more than 70 nm. These ranges may be used because transparency, strength, and hardness may be improved. Such improvements are obtained to a great degree particularly in a case where the molded article is to be stretched. Further, the mean particle diameter may be not less than 20 nm. If the mean particle diameter is less than 20 nm, it may cause degradation in strength, such as reduction in cracking resistance.

The mean particle diameter can be determined by a dynamic light-scattering method using, for example, MICROTRAC UPA150 (manufactured by Nikkiso Co., Ltd.), or by a turbidimetric method in which a turbidimeter is used to measure the permeability of a polymerization liquid per unit weight. The mean particle diameter in the layers of the particulate (meth)acrylic multilayer structure graft copolymer excluding the outermost layer is the mean particle diameter before the polymerization reaction of the outermost layer is initiated.

A method used for producing the (meth)acrylic multilayer structure graft copolymer is not particularly limited, and a known method is applicable, such as emulsion polymerization, emulsion-suspension polymerization, suspension polymerization, bulk polymerization, or solution polymerization. Among these methods, emulsion polymerization may be used because the multilayer structure graft copolymer can be readily obtained and the layered structure can be readily controlled with the method.

In the case of producing the (meth)acrylic multilayer structure graft copolymer by emulsion polymerization, the production can be performed by ordinary emulsion polymerization using a known emulsifying agent. Specific examples of the emulsifying agent include: anionic surfactants, such as sodium alkylsulfonate, sodium alkylbenzene sulfonate, sodium dioctyl sulfosuccinate, sodium lauryl sulfate, fatty acid sodium, and phosphoric acid ester salts, such as polyoxyethylene lauryl ether sodium phosphate; and non-ionic surfactants, such as reaction products resulting from the reaction of alkylphenols or aliphatic alcohols with propylene oxide and/or ethylene oxide. Each of these surfactants may be used alone, or two or more kinds of these surfactants may be used in combination. If necessary, a cationic surfactant, such as an alkylamine salt, may be used additionally. Among these surfactants, in particular, a phosphoric acid ester salt (alkali metal or alkaline-earth metal), such as polyoxyethylene lauryl ether sodium phosphate, may be used in polymerization from the viewpoint of improving the thermal stability of an obtained acrylic rubber polymer (B).

A multilayer structure polymer latex obtained as a result of emulsion polymerization is treated by a known method, such as spray drying, freeze drying, or a method in which: the multilayer structure polymer latex is coagulated by addition of a coagulant that is a salt such as calcium chloride or magnesium chloride or that is an acid such as hydrochloric acid or sulfuric acid; then the coagulated resin component is removed from the aqueous phase by suitable heat treatment or the like; and thereafter washed and dried. As a result, a powdery multilayer structure polymer is obtained. In the case of obtaining the multilayer structure polymer by coagulating the polymer latex, a known coagulant such as an acid or a salt can be used in the coagulation. From the viewpoint of improving the thermal stability of the obtained copolymer at the time of molding, the use of a magnesium salt, such as a magnesium sulfate may be.

The (meth)acrylic multilayer structure graft copolymer may be obtained by multi-stage polymerization. For example, at least in the first stage of the multi-stage polymerization, in the presence of polymer particles, a mixture containing other monomers copolymerizable with the polymer particles is added to perform polymerization. The same operation is performed in the second and the following stage(s) of the polymerization, and thereby a multilayer structure can be formed.

The (meth)acrylic multilayer structure graft copolymer can be produced, for example, in the following manner: obtain methacrylic polymer particles (b-1) by polymerizing a monomer mixture containing 50 to 100% by weight of a methacrylic acid ester, 50 to 0% by weight of a monomer copolymerizable with the methacrylic acid ester, and 0.05 to 10 parts by weight of a polyfunctional monomer (with respect to the total of 100 parts by weight of the methacrylic acid ester and the monomer copolymerizable therewith); then obtain a (meth)acrylic rubber-containing graft copolymer (b-2) by polymerizing, in the presence of the above methacrylic polymer particles, a monomer mixture containing 50 to 100% by weight of an acrylic acid alkyl ester having an alkyl group with 4 to 12 carbon atoms, 50 to 0% by weight of another monomer copolymerizable with the acrylic acid alkyl ester, and 0.05 to 10 parts by weight of a polyfunctional monomer (with respect to the total of 100 parts by weight of the acrylic acid alkyl ester having an alkyl group with 4 to 12 carbon atoms and the other monomer copolymerizable with the acrylic acid alkyl ester); and thereafter obtain a (meth)acrylic multilayer structure graft copolymer (b-3) by polymerizing, in the presence of the above (meth)acrylic rubber-containing graft copolymer, a monomer mixture containing 50 to 100% by weight of a methacrylic acid ester, 50 to 0% by weight of a monomer copolymerizable with the methacrylic acid ester, and 0 to 10 parts by weight of a polyfunctional monomer (with respect to the total of 100 parts by weight of the methacrylic acid ester and the monomer copolymerizable therewith). The (meth)acrylic multilayer structure graft copolymer (b-3) obtained in this manner may be used. Here, in the (b-1) polymerization stage and/or the (b-2) polymerization stage and/or the (b-3) polymerization stage, the monomer components contained in the monomer mixture may be entirely mixed together and polymerized by single-stage polymerization, or may be polymerized by multi-stage polymerization while varying the monomer composition for each stage.

[Optical Resin Composition]

If, in the optical resin composition, the sum of the acrylic resin and the (meth)acrylic multilayer structure graft copolymer is 100% by weight, then the acrylic resin is blended such that the optical resin composition contains 99 to 50% by weight of the acrylic resin.

Also, the (meth)acrylic multilayer structure graft copolymer is blended such that the optical resin composition may contain 1 to 50% by weight, such as 1 to 25% by weight, or such as 1 to 15% by weight of the (meth)acrylic multilayer structure graft copolymer. If the optical resin composition contains less than 1% by weight of the (meth)acrylic multilayer structure graft copolymer, it may cause insufficiency in strength, such as insufficiency in flex resistance. On the other hand, if the optical resin composition contains more than 50% by weight of the (meth)acrylic multilayer structure graft copolymer, the thermal resistance, surface hardness, transparency, and the flex whitening resistance of the molded article, in particular, such properties of a film, tend to degrade.

The optical resin composition contains at least one kind of the acrylic resin and at least one kind of the (meth)acrylic multilayer structure graft copolymer. In addition, one or more kinds of other resins can be added to the optical resin composition without any restrictions. Examples of the other resins that can be additionally blended into the optical resin composition as necessary include: a partially-hydrogenated styrene-based polymer obtained by partial hydrogenation of aromatic rings of a styrene-based polymer that is obtained by polymerization of a styrene monomer and another monomer copolymerizable therewith; a polymer containing a cyclic acid anhydride repeating unit; polyethylene terephthalate resin; and polybutylene terephthalate resin.

If necessary, the optical resin composition may contain a known additive agent, such as a light stabilizer, ultraviolet absorber, heat stabilizer, deluster, light diffuser, colorant, dye, pigment, antistatic agent, heat ray reflector, lubricant, plasticizer, ultraviolet absorber, stabilizer, or a filler.

A method used for preparing the optical resin composition is not particularly limited, and a known method can be used. For example, the optical resin composition can be prepared by blending and mixing the acrylic resin, the (meth)acrylic multilayer structure graft copolymer, and if necessary, another resin and/or an additive agent.

[Molded Article]

The optical resin composition in the form of original particles or in the form of pellets (the pellets are obtained by using an extruder) may be subjected to molding, such as extrusion molding, injection molding, compression molding, blow molding, or spinning molding, while heating the optical resin composition, and thereby a molded article having a shape suitable for its intended use can be obtained. The optical resin composition is particularly useful as a film, and is satisfactory processed by blown film extrusion or T-die extrusion, which is an ordinary melt extrusion method, or a calendering method, or a solvent casting method, for example. Among these, a melt extrusion method using no solvent may be used. The use of a melt extrusion method makes it possible to lower the production cost and reduce burdens on the global environment and working environment that are caused by solvents.

Further, an extruder used for molding the optical resin composition may include one or more devolatilizers for removing volatile matter produced during melting by heating. By including one or more devolatilizers, degradation of film appearance due to foaming and/or decomposition/deterioration reaction of the resin can be reduced.

Moreover, during melt extrusion for molding the optical resin composition, an inert gas such as nitrogen or helium may be supplied to the cylinder of the extruder together with the resin material. By supplying the inert gas, the concentration of oxygen in the system can be lowered, and thereby appearance and/or quality degradation caused by oxidation degradation, such as decomposition, crosslinking, and/or yellowing, can be reduced.

Examples of the usage of the optical resin composition molded article according to one or more embodiments of the present invention include: lenses for common cameras; lenses for video cameras; object lenses, diffraction gratings, holograms, and collimator lenses for laser pickup; fθ lenses for laser printers; cylindrical lenses; condenser lenses or projector lenses for liquid crystal projectors; Fresnel lenses; and lenses for eyeglasses and the like; disc substrates for compact discs (e.g., CDs and CD-ROMs), mini discs (MDs), and DVDs; components of liquid crystal elements, such as light guide plates for liquid crystals, films for liquid crystals, substrates for LCDs, and adhesives for bonding liquid crystal elements; screens for projectors; optical filters; optical fibers, optical waveguides; prisms; lenses for lighting; automobile headlights; medical supplies requiring sterilization; microwave cooking containers; the housing of home appliances; toys; and recreation items.

[Film]

When the optical resin composition is formed into a film, if necessary, both surfaces of the film may be brought into contact with (sandwiched between) rolls or metal belts at the same time, particularly rolls or metal belts heated to a temperature around the glass transition temperature of the film, so that the film with better surface properties can be obtained. Further, the film may be subjected to lamination forming or may be reformed by biaxial stretching in accordance with its intended use.

Hereinafter, as one embodiment of a film production method, a method of producing a film by melt extrusion molding of the optical resin composition is described in detail.

It should be noted that, in the description below, a film formed by melt extrusion molding is referred to as a "melt-extruded film" to differentiate it from a film formed by a different method such as solution casting.

In a case where the optical resin composition is formed into a film by melt extrusion molding, the optical resin composition is first fed to an extruder and melted by heating.

The optical resin composition may be pre-dried before being fed to the extruder. By performing such pre-drying, foaming of the resin extruded from the extruder can be prevented.

A method used for the pre-drying is not particularly limited, but for example, a raw material (i.e., the optical resin composition) may be pre-dried by using a hot-blast dryer or the like after being formed into pellets or the like.

Then, the optical resin composition melted by heating in the extruder is fed through a gear pump or a filter to a T-die. By using a gear pump at the time, uniformity in the resin extrusion amount can be improved, and thereby thickness variation can be reduced. On the other hand, the use of a filter makes it possible to remove extraneous matter from the optical resin composition, and as a result, a film having excellent appearance with no defects can be obtained.

The filter to be used may be a stainless steel leaf-disk filter that can remove extraneous matter from a melted polymer, and a filter element to be used may be a fiber type, a powder type, or a complex type thereof. The filter can be suitably used for an extruder or the like for use in film formation or pellet formation.

Then, the optical resin composition fed to the T-die is extruded through the T-die as a sheet-shaped melted resin. The sheet-shaped melted resin is sandwiched between two cooling rolls and thereby cooled down to form a film.

One of the two cooling rolls sandwiching the sheet-shaped melted resin may be a rigid metal roll having a smooth surface, and the other cooling roll may be a flexible roll provided with a metal elastic external cylinder that has a smooth surface and that is elastically deformable.

By sandwiching and cooling down the sheet-shaped melted resin between the rigid metal roll and the flexible roll provided with a metal elastic external cylinder, surface microirregularities, die lines, etc., are eliminated from the resulting film. In this manner, a film having a smooth surface and a thickness variation of 5 μm or less can be obtained.

It should be noted that the term "cooling roll" herein covers the meaning of both "touch roll" and "cooling roll".

Even in the case of using the aforementioned rigid metal roll and flexible roll, when a film to be formed is thin, there is a case where the surfaces of the cooling rolls come into contact with each other, so that the outer surfaces of the cooling rolls are damaged or the cooling rolls themselves are broken, because both the cooling rolls have a metal surface.

Therefore, in the case of sandwiching the sheet-shaped melted resin between such two cooling rolls as described above to form a film, the sheet-shaped melted resin is first sandwiched between the two cooling rolls to be cooled down, and thereby a film is obtained.

Since the film has very high toughness and is highly flexible, it is not necessary to stretch the film to improve its strength. Accordingly, by eliminating the stretching process, productivity is improved and cost advantages are obtained. The film is allowed to have a thickness of 10 μm or more while having high transparency and high strength. Moreover, orientation birefringence of the film due to stretching does not substantially occur, and the film is optically isotropic. Furthermore, the film exhibits a small degree of thermal contraction, for example, during secondary forming such as vacuum forming or during its use at high temperatures.

Although the film achieves the above advantageous effects even in an unstretched state, the film can be further stretched, and thereby the film strength and film thickness precision can be improved. In addition, by selecting suitable stretching conditions, a film with small thickness variation can be readily produced without substantially causing birefringence and without substantially causing increase in haze value.

In the case of producing a stretched film, the stretched film (uniaxially stretched film or biaxially stretched film) can be produced by molding the optical resin composition to temporarily form an unstretched film and then subjecting the unstretched film to uniaxial stretching or biaxial stretching. For example, a film having a thickness of 40 μm may be produced in the following manner: sandwich a sheet-shaped melted resin between the aforementioned two cooling rolls to cool down the resin, thereby temporarily obtaining an unstretched film having a thickness of 150 μm; and then biaxially stretching the film longitudinally and laterally.

For the sake of convenience of the description, the film that is obtained by molding the optical resin composition, but not yet subjected to stretching, i.e., an unstretched film, is referred to as a "raw material film" herein.

In the case of stretching the raw material film, the raw material film may be continuously subjected to the stretching immediately after the raw material film is obtained by the molding, or alternatively, after the raw material film is obtained by the molding, the raw material film may be temporarily stored or moved to a different location, and then subjected to the stretching.

It should be noted that, in the case of stretching the raw material film immediately after the raw material film is obtained by the molding, the film may stay as the raw material film for a very short period of time (in some cases, for only a moment) before going through the stretching in a film production process, or alternatively, after the raw material film is produced, the raw material film may be subjected to the stretching after a certain interval of time.

In the case of producing the film as a stretched film, it is not necessary for the raw material film to be in a perfect film state, and it will suffice if the raw material film is in a film form that is sufficient to go through the stretching.

A method used for stretching the raw material film is not particularly limited, and any conventionally known stretching method may be used. Specifically, the raw material film may be subjected to, for example, lateral stretching using a tenter, longitudinal stretching using a roll, or sequential biaxial stretching in which such lateral stretching and longitudinal stretching are sequentially combined.

Alternatively, the stretching method to be used may be a simultaneous biaxial stretching method in which lateral stretching and longitudinal stretching are simultaneously performed, or may be a method in which longitudinal stretching using a roll is performed and thereafter lateral stretching using a tenter is performed.

At the time of stretching the raw material film the raw material film is first preheated to a temperature that is higher than the stretching temperature by 0.5 to 5° C., or higher than the stretching temperature by 1 to 3° C., and then cooled down to the stretching temperature before being stretched.

By preheating the raw material film to a temperature within the above range, the thickness of the raw material film can be kept precisely, and there is neither a risk of reduction in the thickness precision of the stretched film nor a risk of thickness variation of the stretched film. Further, the raw material film is prevented from adhering to a roll or sagging due to its own weight.

On the other hand, if the preheating temperature of the raw material film is excessively high, an adverse effect, such as adhesion of the raw material film to a roll or sagging of the raw material film due to its own weight, tends to occur. Further, if a difference between the preheating temperature and the stretching temperature of the raw material film is small, there are the following tendencies: the thickness precision of the raw material film before the stretching is less likely to be kept; the thickness variation is increased; and the thickness precision is reduced.

It should be noted that, after the raw material film is formed by the molding of the optical resin composition, at the time of stretching the raw material film, it is difficult to improve the thickness precision by utilizing a necking phenomenon. Therefore, controlling the aforementioned preheating temperature is important to keep or improve the thickness precision of the obtained film.

The stretching temperature at which the raw material film is stretched is not particularly limited, and may be changed in accordance with, for example, mechanical strength, surface properties, and thickness precision that the stretched film to be produced is required to have.

In general, when the glass transition temperature of the raw material film determined by a DSC method is Tg, the stretching temperature is in the range of (Tg−30° C.) to (Tg+30° C.), such as in the range of (Tg−20° C.) to (Tg+20° C.), and such as in the range of (Tg) to (Tg+20° C.).

By setting the stretching temperature to be within the above temperature range, the thickness variation of the obtained stretched film can be reduced, and in addition, mechanical properties of the film, such as elongation rate, tear propagation strength, and flex fatigue resistance, can be made favorable. Further, the occurrence of problems, such as adhesion of the film to a roll, can be prevented.

On the other hand, if the stretching temperature is higher than the above temperature range, the obtained stretched film tends to have great thickness variation, and mechanical properties of the film, such as elongation rate, tear propagation strength, and flex fatigue resistance, tend to be not sufficiently improved. Further, problems such as adhesion of the film to a roll tend to occur.

If the stretching temperature is lower than the above temperature range, the obtained stretched film tends to have a high haze value, or in an extreme case, problems such as tearing or cracking of the film tend to occur during the production process.

In the case of stretching the above raw material film, its stretch ratio is also not particularly limited, and may be determined in accordance with, for example, mechanical strength, surface properties, and thickness precision that the stretched film to be produced is required to have. In general, the stretch ratio is selected in the range of 1.1 to 3 times, such as in the range of 1.3 to 2.5 times, or such as in the range of 1.5 to 2.3 times although the stretch ratio also depends on the stretching temperature.

If the stretch ratio is within the above range, mechanical properties of the film, such as elongation rate, tear propagation strength, and flex fatigue resistance, can be improved significantly. Therefore, a stretched film that has a thickness variation of 5 μm or less, exhibits substantially zero birefringence, and has a haze value of 2.0% or less can be produced.

The thickness of the film is not particularly limited. However, the thickness may be 500 μm or less, such as 300 μm or less, or such as 200 μm or less. Further, the thickness is 10 μm or more, such as 30 μm or more, such as 50 μm or more, or such as 100 μm or more. When the film thickness is within the above range, there is an advantage that, when vacuum forming is performed using the film, deformation is less likely to occur and a deep-drawn portion is less likely to be broken, and also, a film with uniform optical properties and favorable transparency can be produced. On the other hand, if the film thickness exceeds the above range, the film is non-uniformly cooled down after film formation, which tends to cause non-uniform optical properties of the film. If the film thickness is less than the above range, the film may be difficult to handle.

The film may have a haze value of 2.0% or less, such as 1.0% or less, such as 0.8% or less, or such as 0.5% or less. When the film has a haze value within the above range, the film has sufficiently high transparency, and is suitable for optical applications, decorative applications, and interior applications requiring transparency, or for vacuum forming.

The internal haze value of the film may be 1.5% or less, such as 1.0% or less, such as 0.5% or less, or such as 0.3% or less. When the internal haze value of the film is within the above range, the film can be suitably used as a polarizer-protective film.

The film may have a total light transmittance of 85% or more, or such as 88% or more. When the film has a total light transmittance within the above range, the film has sufficiently high transparency, and is suitable for optical applications, decorative applications, and interior applications requiring transparency, or for vacuum forming.

The film may have a glass transition temperature of not lower than 110° C., such as not lower than 115° C., such as not lower than 120° C., or such as not lower than 124° C. When the glass transition temperature is within the above range, the obtained film has sufficiently high thermal resistance.

The film may have a tensile elongation at break of not less than 10%, such as not less than 20%, such as not less than 30%, such as not less than 40%, such as not less than 50%, such as not less than 60%, or such as not less than 90%. When having a tensile elongation at break within the above range, the film is less likely to be cracked when cut out with a Thomson blade or a cutter blade (i.e., trimming property) and is less likely to be broken when rolled up or when the surface of the film is subjected to post-processing such as coating, vapor deposition, sputtering, or bonding to a protective film. Further, the film has high flex resistance when bent, and problems such as cracks do not occur not only when the film is subjected to post-processing but also when the film is put in practical use as a product. The cracking resistance is particularly correlated with tensile elongation at break, and the higher the tensile elongation at break, the better the cracking resistance.

The film may be used as an optical film as described above. In this case, when the film is used as a polarizer-protective film, the film may have low optical anisotropy. In particular, the optical anisotropy of the film may be low not only in its in-plane direction (length direction, width direction) but also in its thickness direction. In other words, both the in-plane phase difference and the absolute value of the thickness-direction phase difference of the film may be small. More specifically, the in-plane phase difference may be 10 nm or less, such as 6 nm or less, such as 5 nm or less, or such as preferably 3 nm or less. Also, the absolute value of the thickness-direction phase difference may be 50 nm or less, such as 20 nm or less, such as 15 nm or less, such as 10 nm or less, or such as 5 nm or less. The film having such phase differences can be suitably used as a polarizer-protective film of a polarizing plate in a liquid crystal display device. On the other hand, if the film that has an in-plane phase difference exceeding 10 nm or has an absolute value of the thickness-direction phase difference exceeding 50 nm is used as a polarizer-protective film of a polarizing plate in a liquid crystal display device, a problem such as reduction in the contrast of the liquid crystal display device may occur.

Each of the phase differences is an index value calculated based on birefringence. The in-plane phase difference (Re) and thickness-direction phase difference (Rth) can be calculated by respective equations shown below. In the case of an ideal film that is completely optically isotropic in three dimensional directions, its in-plane phase difference Re and thickness-direction phase difference Rth are both zero.

$$Re = (nx - ny) \times d$$

$$Rth = ((nx + ny)/2 - nz) \times d$$

Assuming that the in-plane stretching direction (orientation direction of polymer chains) corresponds an X axis, the direction perpendicular to the X axis corresponds to a Y axis, and the thickness direction of the film corresponds to a Z axis, then in the above equations, nx represents a refractive index in the X-axis direction; ny represents a refractive index in the Y-axis direction; nz represents a refractive index in the Z-axis direction; d represents a film thickness; and nx−ny represents orientation birefringence. It should be noted that in the case of a melt-extruded film, the MD direction corresponds to the X axis, and in the case of a stretched film, the stretching direction corresponds to the X axis.

The value of the orientation birefringence of a molded article made of the optical resin composition may be $-15 \times 10^{-4}$ to $15 \times 10^{-4}$, such as $-10 \times 10^{-4}$ to $10 \times 10^{-4}$, such as $-5 \times 10^{-4}$ to $5 \times 10^{-4}$, such as $-1.6 \times 10^{-4}$ to $1.6 \times 10$, such as $-1 \times 10$ to $1 \times 10$, such as $-0.5 \times 10^{-4}$ to $0.5 \times 10$, or such as $-0.2 \times 10^{-4}$ to $0.2 \times 10^{-4}$. When the orientation birefringence is within the above range, a molded article with no occurrence of birefringence during mold processing and with no problem in terms of its practical use can be obtained.

Also, the value of the orientation birefringence of the film may be $-1.7 \times 10^{-4}$ to $1.7 \times 10^{-4}$, such as $-1.6 \times 10^{-4}$ to $1.6 \times 10^{-4}$, such as $-1.5 \times 10^{-4}$ to $1.5 \times 10^{-4}$, such as $-1.0 \times 10^{-4}$ to $1.0 \times 10^{-4}$, such as $-0.5 \times 10^{-4}$ to $0.5 \times 10^{-4}$, or such as $-0.2 \times 10^{-4}$ to $0.2 \times 10^{-4}$. When the orientation birefringence is within the above range, no birefringence occurs during mold processing, and thus stable optical properties can be obtained, and also, the obtained film is highly suitable as an optical film to be used in a liquid crystal display or the like.

The molded article made of the optical resin composition has a photoelastic constant of $-10 \times 10^{-12}$ to $10 \times 10^{-12}$, such as $-4 \times 10^{-12}$ to $4 \times 10^{-12}$, such as $-2 \times 10^{-12}$ to $2 \times 10^{-12}$, such as $-1 \times 10^{-12}$ to $1 \times 10^{-12}$, such as $-0.5 \times 10^{-12}$ to $0.5 \times 10^{-12}$, or such as $-0.3 \times 10^{-12}$ to $0.3 \times 10^{-12}$. When the photoelastic constant is within the above range, the molded article exhibits small birefringence even if stress is applied thereto in an environment of, for example, high temperature and high humidity. Therefore, the obtained molded article can be put into practical use with no problem.

Also, the photoelastic constant of the film may be $-4 \times 10^{-12}$ $Pa^{-1}$ to $4 \times 10^{-12}$ $Pa^{-1}$, such as $-1.5 \times 10^{-12}$ $Pa^{-1}$ to $1.5 \times 10^{-12}$ $Pa^{-1}$, such as $-1.0 \times 10^{-12}$ $Pa^{-1}$ to $1.0 \times 10^{-12}$ $Pa^{-1}$, such as $-0.5 \times 10^{-12}$ $Pa^{-1}$ to $0.5 \times 10^{-12}$ $Pa^{-1}$, or such as $-0.3 \times 10^{-12}$ $Pa^{-1}$ to $0.3 \times 10^{-12}$ $Pa^{-1}$ or less When the photoelastic constant is within the above range, the film exhibits small birefringence even if the film is used in a liquid crystal display device and stress is applied to the molded article in an environment of, for example, high temperature and high humidity. Therefore, problems such as phase difference variation, reduction in contrast at peripheral areas on the display screen, and light leakage do not occur.

The film can be used, for example, after being laminated on another film by using a pressure-sensitive adhesive or the like, or after being coated with a coating layer such as a hard coating layer that is formed on the film surface, as necessary.

For the purpose of orientation birefringence adjustment, the optical resin composition may be blended with birefringent inorganic microparticles described in Japanese Patent Publication No. 3648201 or Japanese Patent Publication No. 4336586, or may be blended with a birefringent low-molecular compound having a molecular weight of 5,000 or less (such as 1,000 or less), which is described in Japanese Patent Publication No. 3696649, as necessary.

The gloss of the film surface can be reduced by a known method as necessary. The gloss of the film surface can be reduced by, for example, a method of kneading an inorganic filler into the optical resin composition. The gloss of the film surface can be reduced also by embossing the obtained film.

The film may be used in the form of being laminated onto a metal, plastic, or the like. Examples of a method of laminating the film include: lamination forming; wet lamination in which after an adhesive is applied to a metal plate, such as a steel plate, the film is placed onto the metal plate and then dried such that the film and metal plate are bonded together; dry lamination; extrusion lamination; and hot melt lamination.

Examples of a method of laminating the film on a plastic component include: insert molding or laminate injection press molding in which the film is placed in a mold in advance and then a resin is injected into the mold by injection molding; and in-mold forming in which the film is pre-formed and then placed in a mold, and thereafter a resin is injected into the mold by injection molding.

The resulting film-laminated article may be used on, for example, interior or exterior materials of automobiles as an alternative to painting, building materials such as window frames, bathroom fitments, wall papers, and floor materials, everyday sundries, furniture, the housing of electrical appliances, the housing of office automation equipment such as facsimiles, laptop PCs, and copying machines, front panels of liquid crystal display screens of terminal equipment such as mobile phones, smartphones, and tablets, and parts of electric or electronic devices.

The film may be used for various purposes by utilizing its properties such as thermal resistance, transparency, and flexibility. For example, the film may be used for: the interior and exterior of automobiles, interior and exterior of personal computers, interior and exterior of mobile devices, and interior and exterior of solar cells; solar cell back sheets; photographic lenses for cameras, VTRs, and projectors; finders, filters, prisms, Fresnel lenses, and the like for use in the field of imaging; lenses such as pick-up lenses for optical discs in CD players, DVD players, MD players, and the like for use in the field of lenses; optical discs such as CDs, DVDs, and MDs for use in the field of optical recording; films for liquid crystal displays, such as liquid crystal light guide plates, diffuser plates, back sheets, reflection sheets, polarizer-protective films, polarizing film transparent resin sheets, phase difference films, light-diffusing films, and prism sheets, surface protective films, and the like for use in the field of information devices; optical fibers, optical switches, optical connectors, and the like for use in the field of optical communications; automobile headlights, tail lamp lenses, inner lenses, instrument covers, sunroofs, and the like for use in the field of vehicles; eyeglasses, contact lenses, lenses for endoscopes, medical supplies requiring sterilization, and the like for use in the medical field; road signs, bathroom fitments, floor materials, translucent panels for roads, lenses for double-glazed glass, lighting windows, carports, lenses for lighting, lighting covers, sidings as building materials, and the like for use in the fields of architecture and building materials; microwave cooking containers (plates); the housing of home appliances; toys; sunglasses; and stationery. The film may be used also as a substitute for a molded article on which a transfer foil sheet is used.

In a case where the film is used as a polarizer-protective film of a polarizing plate, the polarizing plate can be fabricated in a manner described below, for example.

The polarizer used in the polarizing plate may be any polarizer, so long as the polarizer has such a function that only light with a specific vibration direction is transmitted through the polarizer. In general, a PVA-based (polyvinyl alcohol-based) polarizer may be used.

The PVA-based polarizer is obtained, for example, by causing a hydrophilic polymeric film such as a PVA-based film to adsorb a dichroic material such as iodine or dichroic dye, and then stretching the resulting film uniaxially. The thickness of the polarizer is not particularly limited. In general, the thickness is about 1 to 100 μm.

In the case of forming an easily adhesive layer (primer layer) on a surface of the polarizer-protective film, the surface coming into contact with the polarizer, for the purpose of improving the adhesion to the polarizer, an adhesive used for forming the easily adhesive layer may be an urethane-based resin, acrylic resin, silicone-based resin, cellulosic resin, or an epoxy-based resin from the viewpoint of the adhesion. The thickness of the easily adhesive layer may be 0.1 to 10 μm, such as 0.2 to 5 μm. If the thickness of the easily adhesive layer is less than 0.1 μm, there is a case where sufficient adhesive force cannot be obtained. If the thickness of the easily adhesive layer is more than 10 μm, the drying time is prolonged, and thereby the productivity tends to be reduced. The aforementioned polyurethane resin-based or acrylic resin-based primer may be either an aqueous primer or an organic primer. From the viewpoints of environment and work efficiency, an aqueous easily adhesive composition may be used. The easily adhesive composition may contain a small amount of organic solvent from the viewpoints of dispersibility and solubility. There are two types of the easily adhesive layer, i.e., one-pack type and two-pack type. Either type can be suitably used.

The adhesion of the film to polyvinyl alcohol may be not less than 1N/25 mm, such as not less than 2N/25 mm, or such as not less than 3N/25 mm. The adhesion to polyvinyl alcohol varies depending on the kind of the polyvinyl alcohol and the kind of the adhesive, and the required adhesive force also varies depending on intended use. The film is usable in certain cases if the adhesion is not less than 1N/25 mm. However, the adhesion is may be not less than 3N/25 mm so that the film can be used in a wider variety of cases.

Any suitable method is adoptable as a coating method of the easily adhesive layer. Examples of the coating method include bar coating, roll coating, gravure coating, rod coating, slot orifice coating, curtain coating, and fountain coating.

The drying temperature of the aforementioned polyurethane resin-based or acrylic resin-based primer may be 50° C. or higher, such as 80° C. or higher.

The aforementioned polyurethane resin-based or acrylic resin-based primer may further contain any suitable additive agent. Examples of the additive agent include an anti-blocking agent, dispersion stabilizer, thixotropic agent, antioxidant, ultraviolet absorber, defoaming agent, thickener, dispersant, surfactant, catalyst, filler, lubricant, and an antistatic agent.

The polarizer-protective film can be formed on at least one surface of the polarizer.

The polarizing plate obtained as a result of laminating the polarizer-protective film on the polarizer can be further laminated on a base material, such as glass, a pressure-sensitive adhesive, or an adhesive.

The polarizing plate can be bonded and laminated onto the base material by forming an adhesive layer on the polarizer-protective film. Any suitable adhesive can be used as the adhesive of the adhesive layer. Considering the affinity to the polarizer, the adhesive may be an adhesive composition containing a polyvinyl alcohol-based resin. The adhesive composition may contain an acetoacetyl group-containing polyvinyl alcohol resin. By using the adhesive composition containing an acetoacetyl group-containing polyvinyl alcohol resin, the adhesion between the polarizer and the (meth)acrylic resin film is further improved.

The mean polymerization degree of the polyvinyl alcohol-based resin is not particularly limited, but may be about 100 to 5,000, such as 1,000 to 4,000.

The adhesive composition may contain a crosslinking agent as necessary. The crosslinking agent may have a functional group that is reactive with the polyvinyl alcohol-based resin.

Examples of the functional group reactive with the polyvinyl alcohol-based resin include an amine group, isocyanate group, epoxy group, aldehyde group, and a methylol group. Among these, a compound having a methylol group may be used, such as methylol melamine.

Although the blending amount of the crosslinking agent is not particularly limited, the blending amount may be about 10 to 60 parts by weight, such as 20 to 50 parts by weight, with respect to 100 parts by weight of the polyvinyl alcohol-based resin.

Any of various coupling agents or tackifiers may be added to the adhesive composition for the purpose of further increasing its adhesion. A silane coupling agent may be a coupling agent. In addition, an ultraviolet absorber, antioxidant, heat-resistant stabilizer, hydrolysis-resistant stabilizer, etc., may be added to the adhesive composition.

The adhesive composition is usually used as an aqueous solution. The resin concentration may be 0.1 to 15% by weight, such as 0.5 to 10% by weight, from the viewpoint of the balance of coatability and stability.

The thickness of the adhesive layer made of the adhesive composition is set in accordance with, for example, the composition of the adhesive composition. The thickness may be 10 to 300 nm, such as 20 to 150 nm, from the viewpoint of adhesion.

EXAMPLES

Hereinafter, a specific description of one or more embodiments of the present invention is given based on examples, but the present invention is not limited to these examples. In the description below, terms "part(s)" and "%" mean "part(s) by weight" and "% by weight" unless otherwise specified.

(Film Thickness)

The thickness of the film was measured by using a digimatic indicator (manufactured by Mitutoyo Corporation).

(Glass Transition Temperature)

The temperature of a sample was temporarily increased to 200° C. at a rate of 25° C./min by using a differential scanning calorimeter (DSC) SSC-5200 manufactured by Seiko Instruments Inc., then held at 200° C. for 10 minutes, and decreased to 50° C. at a rate of 25° C./min as preliminary adjustment. Then, measurement was performed while the temperature of the sample was being increased to 200° C. at a temperature rise rate of 10° C./min. As a result, a DSC curve was obtained. An integral value was obtained from the DSC curve (DDSC), and the glass transition temperature of the sample was determined from its maximum point.

(Total Light Transmittance and Haze Value)

The total light transmittance and haze value of a film were measured by a method specified in JIS K7105 by using NDH-300A manufactured by NIPPON DENSHOKU INDUSTRIES CO., LTD.

(Internal Haze Value)

In the above haze value measurement, the value measured in a state where the film was immersed in pure water was obtained as an internal haze value.

(Fabrication of Biaxially Stretched Film and Measurement of Various Physical Properties)

(Orientation Birefringence)

A test piece of 18 cm×18 cm was cut out from an unstretched original film having a thickness of 100 μm. The test piece was kept under a temperature of glass transition temperature+10° C. for five minutes with all the four sides of the test piece being held, and at the same time, the test piece was biaxially stretched by two times (in other words, "stretched by 100%") at a rate of 120 mm/min. Thereafter, the film obtained in this manner was cooled down to 23° C., and a sample was taken from the central portion of the film. The sample was subjected to measurement of birefringence (orientation birefringence) with the use of an automatic birefringence meter (KOBRA-WR manufactured by Oji Scientific Instruments Co., Ltd.) at a temperature of 23±2° C., a humidity of 50±5%, a wavelength of 590 nm, and an incidence angle of 0°. At the same time, an in-plane phase difference Re and a thickness-direction phase difference Rth (incidence angle: 40°) were also measured. (The in-plane phase difference Re and the thickness-direction phase difference Rth are described below in detail).

(In-Plane Phase Difference Re and Thickness-Direction Phase Difference Rth)

A 40 mm×40 mm test piece was cut out from each of stretched films obtained in Example and Comparative Examples. The in-plane phase difference Re of each test piece was measured with the use of an automatic birefringence meter (KOBRA-WR manufactured by Oji Scientific Instruments Co., Ltd.) at a temperature of 23±2° C., a humidity of 50±5%, a wavelength of 590 nm, and an incidence angle of 0°.

A thickness d of the test piece was measured by using the digimatic indicator (manufactured by Mitutoyo Corporation). Three-dimensional refractive indexes nx, ny, and nz were determined from a refractive index n measured by using an Abbe refractometer (3T manufactured by ATAGO CO., LTD.) and the in-plane phase difference Re and a phase difference value in a direction inclined at 40°, which were measured by using the automatic birefringence meter at a wavelength of 590 nm. Then, the thickness-direction phase difference $Rth=((nx+ny)/2-nz) \times d$ was calculated.

(Evaluation of Mechanical Strength)

(Evaluation of MIT)

The flex resistance of the film was measured in conformity with a method specified in JIS C5016 by using a MIT type folding endurance tester manufactured by Toyo Seiki Seisaku-Sho, Ltd. The measurement was performed under the conditions of: measurement angle=135°; measurement rate=175 times/min; R=0.38; and a load of 100 g.

(Pencil Hardness)

The pencil hardness of the obtained film was measured in conformity with JIS K5600-5-4.

(PVA Bonding Adhesion Test)

(Corona Discharge Treatment)

One side of the (meth)acrylic protective film obtained as described above was subjected to corona discharge treatment (corona discharge electron irradiation amount: 77 W/m2/min).

(Formation of Easily Adhesive Layer)

A mixture was obtained by adding 250 parts by weight of pure water to a one-pack type aqueous urethane resin primer (manufactured by Arakawa Chemical Industries, Ltd.; trade name UREARNO W321 having a solid content of 34%). The corona-discharge-treated surface of the corona-discharge-treated (meth)acrylic protective film was coated with the mixture by a bar coater (No. 3). Thereafter, the (meth)acrylic protective film was fed into a hot-blast dryer (80° C.), and thereby the urethane composition was dried for about five minutes. As a result, an easily adhesive layer (0.2 to 0.4 μm) was formed.

(Preparation of Adhesive Composition)

An aqueous solution having a solid concentration of 1.0% was obtained by dissolving 20 parts by weight of methylol melamine and 100 parts by weight of an acetoacetyl group-containing polyvinyl alcohol-based resin (mean polymerization degree: 1200, saponification degree: 98.5 mol %, acetoacetyl group modification degree: 5 mol %) in pure water under the condition of a temperature of 70° C. The obtained aqueous solution was used as an adhesive composition under the condition of a temperature of 25° C.

(Bonding PVA and (Meth)Acrylic Protective Film)

The (meth)acrylic protective film with the easily adhesive layer formed thereon was subjected to coating treatment, in which the easily adhesive layer side of the (meth)acrylic protective film was coated with the adhesive composition, such that its thickness after drying was 50 nm. Thereafter, a polyvinyl alcohol film Bobron-EX (having a thickness of 12 μm) manufactured by The Nippon Synthetic Chemical Industry Co., Ltd. and the (meth)acrylic protective film were laminated together via the adhesive composition and then fed into a hot-blast dryer (100° C.) to be dried for five minutes. In this manner, a laminated body was obtained.

(Adhesion Strength)

T-type peel test was conducted in conformity with JIS K 6854.

(Graft Ratio)

In 50 ml of methyl ethyl ketone, 2 g of the obtained graft copolymer (multilayer structure particles (E)) was dissolved, and the solution was separated into an insoluble component and a soluble component by centrifugal separation using a centrifugal separator (CP60E manufactured by Hitachi Plant Engineering & Construction Co., Ltd.) at a rotation speed of 30,000 rpm for one hour (three sets of centrifugal separation were performed in total). The obtained insoluble component was used to calculate a graft ratio by using an equation shown below.

Graft ratio (%)={(weight of insoluble component insoluble in methyl ethyl ketone−weight of crosslinked polymer layer)/weight of crosslinked polymer layer}×100

It should be noted that the weight of the crosslinked polymer layer refers to the weight of charged monofunctional monomers that constitute the crosslinked polymer layer.

(Mean Particle Diameter of Multilayer Structure Particles (B) in Layers Up to (Meth)Acrylic Crosslinked Polymer Layer)

The mean particle diameter in the layers of the (meth) acrylic multilayer structure graft copolymer excluding the outermost layer (the mean particle diameter of acrylic rubber particles) was measured when the acrylic rubber particles were in a latex state. In the measurement, Ratio Beam Spectrophotometer U-5100 manufactured by Hitachi High-Technologies Corporation was used as a measuring apparatus, and the mean particle diameter was determined by using light scattering at a wavelength of 546 nm.

(Refractive Index)

The refractive index of the resin was measured in the following manner. Each composition was processed into a sheet, and the refractive index (nD) of the sheet was measured at a sodium D-line wavelength in conformity with JIS K7142 by using an Abbe refractometer 2T manufactured by ATAGO Co., Ltd.

(Polymerization Conversion Rate)

First, part of obtained slurry was sampled and precisely weighed, which was dried in a hot-blast dryer at 120° C. for one hour. The sample after being dried was precisely weighed as a solid content. Next, the ratio between the precise weighing result before the drying and the precise weighing result after the drying was determined as the solid component ratio in the slurry. Finally, a polymerization conversion rate was calculated by a calculation equation shown below by using the solid component ratio. It should be noted that in this calculation equation 1, a chain transfer agent was assumed as a charged monomer.

Polymerization Conversion Rate (%) =[(total weight of charged raw materials×solid component ratio−total weight of raw materials other than water and monomers)/weight of charged monomers]×100

Production Example 1

<Production of Graft Copolymer (B1)>

Substances indicated below were charged into an 8 L polymerizer equipped with a stirrer.
Deionized water: 175 parts
Polyoxyethylene lauryl ether phosphate: 0.55 parts
Boric acid: 0.4725 parts
Sodium carbonate: 0.04725 parts The polymerizer was sufficiently purged with nitrogen gas, such that substantially no oxygen was present therein. Thereafter, the internal temperature of the polymerizer was set to 80° C., and 26% of a raw material mixture (B-1) shown in Table 1 was added into the polymerizer at one time. Subsequently, 0.0645 parts of sodium formaldehyde sulfoxylate, 0.0056 parts of disodium ethylenediaminetetraacetic acid, 0.0014 parts of ferrous sulfate, and 0.010 parts of t-butyl hydroperoxide were added, and when 15 minutes elapsed after the addition, 0.017 parts of t-butyl hydroperoxide was added. Then, polymerization was further continued for 15 minutes. Next, a sodium hydroxide aqueous solution (0.0098 parts in terms of pure content) and 0.0420 parts of polyoxyethylene lauryl ether phosphate were added, and the remaining 74% of (B-1) was continuously added for 30 minutes. When 30 minutes elapsed after the completion of the addition, 0.069 parts of t-butyl hydroperoxide was added, and then polymerization was further continued for 30 minutes. As a result, a polymer of (B-1) was obtained. The polymerization conversion rate was 100.0%.

Thereafter, a sodium hydroxide aqueous solution (0.0267 parts in terms of pure content) and a potassium persulfate aqueous solution (0.04 parts in terms of pure content) were added, and then (B-2) shown in Table 1 was continuously added for 74 minutes. After the completion of the addition, a potassium persulfate aqueous solution (0.0074 parts in terms of pure content) was added, and polymerization was continued for 120 minutes. As a result, a polymer of (B-2) was obtained. The polymerization conversion rate was 98.6%, and the mean particle diameter was 58 nm.

Thereafter, a potassium persulfate aqueous solution (0.062 parts in terms of pure content) was added, and (B-3) shown in Table 1 was continuously added for 186 minutes. Then, polymerization was further continued for one hour, and thereby a graft copolymer latex was obtained. The polymerization conversion rate was 100.0%. The obtained latex was subjected to salting-out with sulfuric acid magnesium, coagulated, washed with water, and dried to obtain a white powdery graft copolymer (B1). The graft ratio of the graft copolymer (B1) was 124%.

Production Example 2

<Production of Graft Copolymer (B2)>
Substances indicated below were charged into an 8 L polymerizer equipped with a stirrer.
Deionized water: 175 parts
Polyoxyethylene lauryl ether phosphate: 0.55 parts
Boric acid: 0.4725 parts
Sodium carbonate: 0.04725 parts The polymerizer was sufficiently purged with nitrogen gas. Thereafter, the internal temperature of the polymerizer was set to 80° C., and 26% of (B-1) shown in Table 1 was added into the polymerizer at one time. Thereafter, 0.0645 parts of sodium formaldehyde sulfoxylate, 0.0056 parts of disodium ethylenediaminetetraacetic acid, 0.0014 parts of ferrous sulfate, and 0.03 parts of t-butyl hydroperoxide were added, and when 15 minutes elapsed after the addition, 0.05 parts of t-butyl hydroperoxide was added. Then, polymerization was further continued for 15 minutes. Next, 0.0098 parts of sodium hydroxide in the form of 2% aqueous solution of sodium hydroxide and 0.0852 parts of polyoxyethylene lauryl ether phosphate were added, and the remaining 74% of (B-1) was continuously added for 60 minutes. When 30 minutes elapsed after the completion of the addition, 0.1 parts of t-butyl hydroperoxide was added, and then polymerization was further continued for 30 minutes. As a result, a polymer of (B-1) was obtained. The polymerization conversion rate was 100.0%.

Thereafter, 0.0267 parts of sodium hydroxide in the form of 2% aqueous solution of sodium hydroxide and 0.08 parts of potassium persulfate in the form of 2% aqueous solution of potassium persulfate were added, and then (B-2) shown in Table 1 was continuously added for 150 minutes. After the completion of the addition, 0.015 parts of potassium persulfate in the form of 2% aqueous solution of potassium persulfate was added, and polymerization was continued for 120 minutes. As a result, a polymer of (B-2) was obtained. The polymerization conversion rate was 99.0%, and the mean particle diameter was 80 nm.

Thereafter, 0.023 parts of potassium persulfate in the form of 2% aqueous solution of potassium persulfate was added, and (B-3) shown in Table 1 was continuously added for 45 minutes. Then, polymerization was further continued for 30 minutes. Subsequently, (B-4) shown in Table 1 was continuously added for 25 minutes, and polymerization was further continued for 60 minutes. As a result, a multi-stage polymerized graft copolymer latex was obtained. The polymerization conversion rate was 100.0%. The obtained latex was subjected to salting-out with sulfuric acid magnesium, coagulated, washed with water, and dried to obtain a white powdery multi-stage polymerized graft copolymer (B2). The graft ratio of the multi-stage polymerized graft copolymer (B2) was 22%.

Production Example 3

<Production of Graft Copolymer (B3)>
Substances indicated below were charged into an 8 L polymerizer equipped with a stirrer.
Deionized water: 175 parts
Polyoxyethylene lauryl ether phosphate: 0.0104 parts
Boric acid: 0.4725 parts
Sodium carbonate: 0.04725 parts The polymerizer was sufficiently purged with nitrogen gas. Thereafter, the internal temperature of the polymerizer was set to 80° C., and 26% of (B-1) shown in Table 1 was added into the polymerizer at one time. Thereafter, 0.0645 parts of sodium formaldehyde sulfoxylate, 0.0056 parts of disodium ethylenediaminetetraacetic acid, 0.0014 parts of ferrous sulfate, and 0.0207 parts of t-butyl hydroperoxide were added, and when 15 minutes elapsed after the addition, 0.0345 parts of t-butyl hydroperoxide was added. Then, polymerization was further continued for 15 minutes. Subsequently, 0.0098 parts of sodium hydroxide in the form of 2% aqueous solution of sodium hydroxide and 0.0852 parts of polyoxyethylene lauryl ether phosphate were added, and the remaining 74% of (B-1) was continuously added for 60 minutes. When 30 minutes elapsed after the completion of the addition, 0.069 parts of t-butyl hydroperoxide was added, and then polymerization was further continued for 30 minutes. As a result, a polymer of (B-1) was obtained. The polymerization conversion rate was 100.0%.

Thereafter, 0.0267 parts of sodium hydroxide in the form of 2% aqueous solution of sodium hydroxide and 0.08 parts of potassium persulfate in the form of 2% aqueous solution of potassium persulfate were added, and then (B-2) shown in Table 1 was continuously added for 150 minutes. After the completion of the addition, 0.015 parts of potassium persulfate in the form of 2% aqueous solution of potassium persulfate was added, and polymerization was continued for 120 minutes. As a result, a polymer of (B-2) was obtained. The polymerization conversion rate was 99.0%, and the mean particle diameter was 225 nm.

Thereafter, 0.023 parts of potassium persulfate in the form of 2% aqueous solution of potassium persulfate was added, and (B-3) shown in Table 1 was continuously added for 45 minutes. Then, polymerization was further continued for 30 minutes. Subsequently, (B-4) shown in Table 1 was continuously added for 25 minutes, and polymerization was further continued for 60 minutes. As a result, a multi-stage polymerized graft copolymer latex was obtained. The polymerization conversion rate was 100.0%. The obtained latex was subjected to salting-out with magnesium chloride, coagulated, washed with water, and dried to obtain a white powdery multi-stage polymerized graft copolymer (B3). The graft ratio of the multi-stage polymerized graft copolymer (B3) was 24%.

TABLE 1

|  |  | (Meth)acrylic multilayer structure graft copolymer (B) | | |
|---|---|---|---|---|
|  |  | B1 | B2 | B3 |
| (B-1) | Monofunctional monomer content (parts) in (B) | 13.32 | 27 | 27 |
|  | Butyl acrylate (%) | 3 | 3 | 3 |
|  | Methyl methacrylate (%) | 97 | 97 | 97 |
|  | Allyl methacrylate (parts) | 0.067 | 0.067 | 0.067 |

TABLE 1-continued

|  |  | (Meth)acrylic multilayer structure graft copolymer (B) | | |
|---|---|---|---|---|
|  |  | B1 | B2 | B3 |
| (B-2) | Monofunctional monomer content (parts) in (B) | 24.68 | 50 | 50 |
|  | Butyl acrylate (%) | 82 | 82 | 82 |
|  | Styrene (%) | 18 | 18 | 18 |
|  | Allyl methacrylate (parts) | 0.37 | 0.37 | 0.37 |
|  | Volume average particle diameter (nm) in (B-2) | 58 | 80 | 225 |
| (B-3) | Monofunctional monomer content (parts) in (B) | 62 | 15 | 15 |
|  | Methyl methacrylate (%) | 96 | 95 | 95 |
|  | Butyl acrylate (%) | 4 | 5 | 5 |
| (B-4) | Monofunctional monomer content (parts) in (B) | — | 8 | 8 |
|  | Methyl methacrylate (%) | — | 52 | 52 |
|  | Butyl acrylate (%) | — | 48 | 48 |
|  | Graft Ratio (%) | 124 | 22 | 24 |

<Acrylic Resin (A1)>

PARAPET HR-S manufactured by KURARAY CO., LTD. was used as an acrylic resin (A1), and its glass transition temperature was 119° C.

Example 1 and Comparative Examples 1 and 2

A mixture of an acrylic resin (A) and a (meth)acrylic multilayer structure graft copolymer (B) shown in Table 2 was fed at a rate of 10 kg/hr to a single screw extruder having a full flighted screw with a diameter of 40 mm. The set temperature in the temperature control zone of the extruder was 255° C., and the screw rotation speed of the extruder was 52 rpm. The resin extruded as a strand through a die provided at the outlet of the extruder was cooled down in a water tank and pelletized by a pelletizer.

The obtained pellets were fed at a rate of 10 kg/hr to a single screw extruder equipped with a leaf-disk filter having an aperture size of 5 μm and connected to a T-die at the outlet of the extruder, and melt-extruded by the extruder to obtain a film having a thickness shown in Table 2 (100 μm). The set temperature in the temperature control zone of the extruder was 260° C. and the screw rotation speed of the extruder was 20 rpm. Films obtained in this manner were formed into stretched films by the method described above in Example, and various physical properties of the films were evaluated.

As shown in Table 2, the stretched film obtained in Example 1 has high transparency and is excellent in terms of adhesion to a polyvinyl alcohol-based film and flex resistance. Moreover, the stretched film obtained in Example 1 has a small phase difference and is excellent in terms of optical isotropy. Furthermore, the stretched film obtained in Example 1 has high surface hardness and is excellent in terms of mechanical strength.

TABLE 3

|  | JP9-309938 | | |
|---|---|---|---|
|  | Comparative Example 9 | Comparative Example 14 | Example 1 |
| Graft Ratio (%) | 74 | 108 | 124 |
| Adhesion to PVA (N/25 mm) | 1.8 | 1.5 | 4.6 |

A graft copolymer was obtained by the method described in Comparative Examples 9 and 14 of JP9-309938.

Stretched films were formed by the method described with respect to Example 1, and various physical properties of the films were evaluated, except the obtained graft copolymer was used instead of a (meth)acrylic multilayer structure graft copolymer (B). The comparison of the copo-

TABLE 2

|  |  |  | Example 1 | Comparative Example 1 | Comparative Example 2 |
|---|---|---|---|---|---|
|  | Acrylic Resin (A) | Kind | A1 | A1 | A1 |
|  |  | (Parts) | 89.87 | 95 | 95 |
|  | (Meth)acrylic multilayer structure graft copolymer (B) | Kind | B1 | B2 | B3 |
|  |  | (Parts) | 10.13 | 5 | 5 |
| Film Properties | Film Thickness | (μm) | 35 | 35 | 35 |
|  | Glass Transition Temperature (DSC) | (° C.) | 118 | 118 | 118 |
|  | Total Light Transmittance | (%) | 92.4 | 92.4 | 92.4 |
|  | Haze Value | (%) | 0.5 | 0.5 | 0.9 |
|  | Internal Haze Value | (%) | 0.3 | 0.3 | 0.3 |
|  | Mechanical Strength MIT | (Number of times) | 1,759 | 1,756 | 1,566 |
|  | Orientation Birefringence (×10$^{-4}$) |  | 0.73 | 0.65 | 0.62 |
|  | Re | nm | 2.6 | 2.3 | 2.7 |
|  | Rth | nm | −10.6 | −9.8 | −10.4 |
|  | Pencil Hardness | 800 g | 2B | 2B | 2B |
|  | Adhesion to PVA | N/25 mm | 4.6 | 1.4 | 2.2 | lymer obtained in Example 1 and those obtained by Comparative Examples 9 and 14 of JP9-309938 is shown in Table 3.

Comparative Examples 9 and 14 were prepared as described in paragraphs [0042], [0046], and [0057]-[0059] of JP9-309938, which are described as follows.
KPS: Potassium Persulfate
t-BH: tert-Butyl hydroperoxide
RON: Sodium formaldehyde sulfoxylate
LO: Polyoxyethylene alkyl phenyl ether sodium phosphate series surfactant "PHOSPHANOL"
LO-529 (Toho Chemical Industry Co., Ltd., trade name)
Table 1 of JP9-309938 is reproduced below.

TABLE 4

| | Monomer Mixture (parts) | | | | | |
|---|---|---|---|---|---|---|
| | 1-1 | 2-1 | 3-1 | 1-2 | 2-2 | 3-2 |
| MMA | 95 | | 95 | 90 | | 92 |
| MA | 5 | | 5 | 10 | | 8 |
| BA | | 83 | | | 83 | |
| St | | 17 | | | 17 | |
| BDMA | 2 | 0.3 | | 0.05 | | |
| AMA | 0.04 | 1.5 | | | 1.75 | |
| n-OM | | | 0.2 | | | 0.3 |

[Example 6 of JP9-309938] In a reaction vessel equipped with a reflux condenser, 190 parts of ion-exchanged water, 0.06 parts of sodium carbonate, and 0.6 parts of boric acid were added. Then, 22.5 parts of a monomer mixture 1-2 having a composition as shown in Table 1 of JP9-309938 (hereinafter, "monomer mixture (1-2)") was added together with 0.06 parts of LO. The resulting mixture was heated to a temperature of 80° C. After the mixture was thus heated, 0.03 parts of a polymerization initiator KPS was added thereto, and the resulting mixture was retained for one hour for the polymerization of the innermost layer. Then, in the presence of this polymer latex, 0.12 parts of the polymerization initiator KPS was added. Thereafter, a mixture of 40 parts of a monomer mixture 2-2 having a composition as shown in Table 1 of JP9-309938 (hereinafter, "monomer mixture (2-2)") and 0.3 parts of LO was continuously added at a rate of 12.5 parts/hour. Then, the resulting mixture was retained for two hours for the polymerization of the middle layer. Next, in the presence of this polymer latex, $2.5 \times 10^{-5}$ parts of Iron(II) sulfate, $7.5 \times 10^{-5}$ parts of EDTA•2Na, and 0.1 parts of RON were added. The resulting mixture was brought into a state where a redox reaction was able to be induced. Then, a mixture of 37.5 parts of a monomer mixture 3-2 having a composition as shown in Table 1 of JP9-309938 (hereinafter, "monomer mixture (3-2)") and 0.06 parts of a polymerization initiator t-BH was continuously added at a rate of 18.8 parts/hour. Thereafter, the resulting mixture was retained for one hour for the polymerization of the outermost layer. As a result, multilayer-structured acrylic polymer latex was obtained. Thereafter, the same operations as those performed in Example 1 of JP9-309938 were performed, and thereby a test piece was obtained.

[Examples 7 to 11 of JP9-309938], [Comparative Examples 9 to 14 of JP9-309938] In these examples, the number of added parts of the monomer mixture (1-2) and the polymerization initiator KPS forming the innermost layer of the multilayer-structured acrylic polymer, the number of added parts of the monomer mixture (2-2) and the polymerization initiator KPS forming the middle layer of the acrylic polymer, and the number of added parts of the monomer mixture (3-2) and the polymerization initiator t-BH forming the outermost layer of the acrylic polymer were varied, and also, the polymerization retention times for the respective layers were varied, as shown in Table 3 of JP9-309938. In these examples, the same operations as those performed in Example 6 of JP9-309938 were performed, and thereby test pieces were obtained. It should be noted that Table 3 of JP9-309938 also shows the same information for Example 6 of JP9-309938.

Table 3 of JP9-309938 is reproduced below.

TABLE 5

| | Innermost Layer | | | Middle Layer | | | Innermost Layer | | |
|---|---|---|---|---|---|---|---|---|---|
| | Monomer mixture (1-2) Number of parts added | Polymerization initiator KPS Number of parts added | Retention time (hours) | Monomer mixture (2-2) Number of parts added | Polymerization initiator KPS Number of parts added | Retention time (hours) | Monomer mixture (3-2) Number of parts added | Polymerization initiator t-BH Number of parts added | Retention time (hours) |
| Example 6 | 22.5 | 0.03 | 1 | 40 | 0.12 | 2 | 37.5 | 0.06 | 1 |
| Example 7 | 12.5 | 0.015 | 0.5 | 52.5 | 0.16 | 2.5 | 35 | 0.06 | 1 |
| Example 8 | 27.5 | 0.035 | 1 | 40 | 0.12 | 2 | 32.5 | 0.05 | 1 |
| Example 9 | 40 | 0.05 | 1.5 | 25 | 0.08 | 1.5 | 35 | 0.06 | 1 |
| Example 10 | 15 | 0.02 | 0.5 | 35 | 0.11 | 2 | 50 | 0.08 | 1.5 |
| Example 11 | 17.5 | 0.025 | 1 | 47.5 | 0.14 | 2.5 | 35 | 0.06 | 1 |
| Comparative Example 9 | 5 | 0.01 | 0.5 | 40 | 0.12 | 2 | 55 | 0.09 | 1.5 |
| Comparative Example 10 | 55 | 0.07 | 2 | 25 | 0.08 | 1.5 | 20 | 0.03 | 1 |
| Comparative Example 11 | 30 | 0.04 | 1 | 15 | 0.05 | 1 | 55 | 0.09 | 1.5 |
| Comparative Example 12 | 15 | 0.02 | 0.5 | 65 | 0.2 | 3 | 20 | 0.03 | 1 |
| Comparative Example 13 | 40 | 0.05 | 1.5 | 45 | 0.14 | 2.5 | 15 | 0.02 | 1 |
| Comparative Example 14 | 10 | 0.015 | 0.5 | 25 | 0.08 | 1.5 | 65 | 0.1 | 1.5 |

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

The invention claimed is:

1. An optical resin composition comprising:
   99 to 50% by weight of an acrylic resin having a glass transition temperature of not lower than 110° C.; and
   1 to 50% by weight of a particulate (meth)acrylic multilayer structure graft copolymer, wherein
   the (meth)acrylic multilayer structure graft copolymer comprises:
   an innermost layer made of a polymer containing not less than 90% by weight of a methacrylic acid ester as a first monomer;
   a middle layer made of a polymer containing, as a second monomer, not less than 80% by weight of an acrylic acid alkyl ester having an alkyl group with 4 to 12 carbon atoms; and
   an outermost layer made of a polymer containing a methacrylic acid ester as a third monomer, and
   a graft ratio of the (meth)acrylic multilayer structure graft copolymer is not less than 110%,
   wherein the optical resin composition has an adhesion to polyvinyl alcohol of not less than 2 N/25 mm.

2. The optical resin composition according to claim 1, wherein
   the third monomer accounts for not less than 90% by weight of the polymer of the outermost layer.

3. The optical resin composition according to claim 1, wherein
   a mean particle diameter of the (meth)acrylic multilayer structure graft copolymer without the outermost layer is not more than 100 nm.

4. The optical resin composition according to claim 2, wherein
   a mean particle diameter of the (meth)acrylic multilayer structure graft copolymer without the outermost layer is not more than 100 nm.

5. A film made of the optical resin composition according to claim 1.

6. A film made of the optical resin composition according to claim 2.

7. A film made of the optical resin composition according to claim 3.

8. A film made of the optical resin composition according to claim 4.

* * * * *